June 9, 1953    C. C. WAUGH    2,641,131
PRESSURE GAUGE
Filed Nov. 21, 1949

INVENTOR.
CHARLES C. WAUGH
BY William R. Lane
ATTORNEY

Patented June 9, 1953

2,641,131

UNITED STATES PATENT OFFICE 2,641,131

PRESSURE GAUGE

Charles C. Waugh, Los Angeles, Calif., assignor to
North American Aviation, Inc.

Application November 21, 1949, Serial No. 128,577

3 Claims. (Cl. 73—398)

This invention pertains to the measurement of fluid or gas pressure, and particularly to a device adapted to measure fluid or gas pressure and produce an electrical signal proportional thereto.

It is an object of this invention to provide a pressure gage adapted for use in connection with corrosive gases or fluids.

It is another object of this invention to provide a pressure gage which yields an electrical signal proportional to the pressure measured.

It is a further object of this invention to provide a pressure pickup adapted to measure pressure variation by means of electrical strain gages.

Other objects of invention will become apparent from the following description taken in connection with the accompanying drawings in which.

Figure 2:
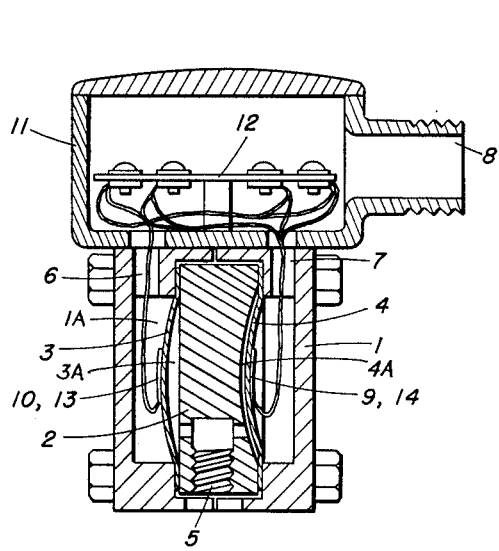
Fig. 2 is a sectional view of the device shown in Fig. 1 taken at 2—2 in Fig. 1.
Figure 1:
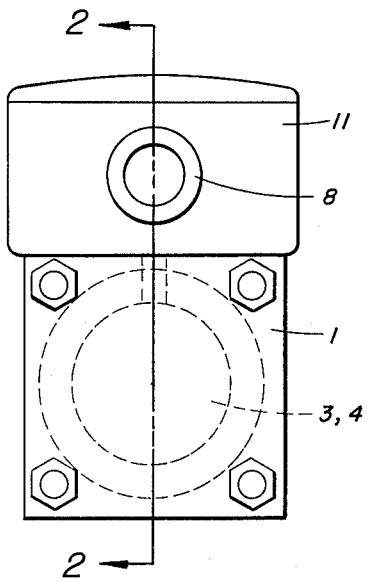
Fig. 1 is a plan view of the device.
Figure 3:
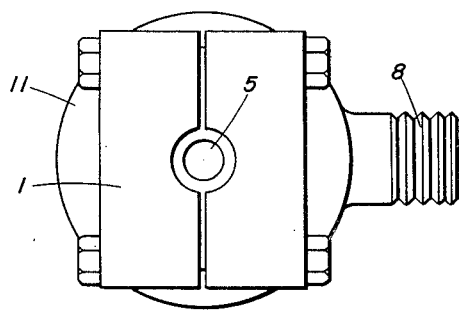
Fig. 3 is an elevational view of the device shown in Fig. 1.

Referring now to the drawings, a casing 1 encloses a core 2 surrounded by identical diaphragm members 3 and 4 which are of spherical dish shape. A port 5 is drilled through casing 1 to communicate with chamber 4a between diaphragm member 4 and core 2 and to communicate with chamber 3a between diaphragm member 3 and core 2. Chamber 1a outside diaphragm members 3 and 4, and yet within casing 1, communicates with the atmosphere through ports 6, 7 and 8. Strain gages 9, 10, 13 and 14 are placed on the outside of diaphragm members 3 and 4 and are connected by electrical conductors to a terminal strip 12 in junction box 11.

Figure 4:
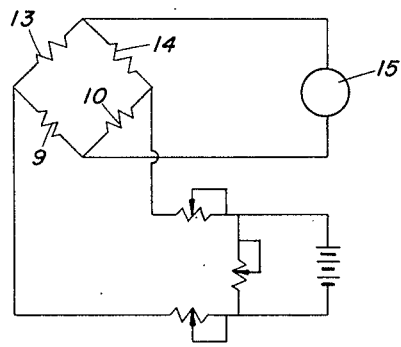
Fig. 4 is an electrical diagram of the invention.

In operation the fluid or gas pressure to be measured is admitted through port 5 to chambers 3a and 4a. Chamber 1a is at atmospheric pressure, therefore, diaphragm members 3 and 4 tend to deflect outward, causing strain gages 10 and 13 to be stretched and strain gages 9 and 14 to be compressed. Since the resistance of these strain gages is proportional to the stress in the members to which they are attached, the resistance of strain gages 10 and 13 tends to be increased, while the resistance of strain gages 9 and 14 tends to decrease upon the application of fluid or gas pressure to port 5. If this variation in resistance is measured by a Wheatstone bridge arrangement and galvanometer 15 or other electrical device, as shown in Fig. 4, it will be found to be proportional to the pressure applied to port 5. Since the strain gages are not exposed to the fluid or gas (the pressure of which it is desired to measure) there is no possibility of any corrosive or deteriorative effect of the pressurized medium on the strain gages themselves. In fact, by using stainless steel or other corrosion-resistant material for the diaphragms and core, the device may be used for the measurement of pressure in corrosive fluid systems. In addition, the difference in resistance measured is due both to the stretching of strain gages 10 and 13 and to the compression of strain gages 9 and 14 so that temperature effects are automatically balanced out, since the two gages are always at the same temperature and diaphragms 3 and 4 are geometrically identical. The device is extraordinarily sensitive by virtue of the fact that a small lateral displacement of the diaphragm produces a relatively high extreme fiber stress due to the magnitude of the lever arms involved. Gages of this type may be installed in remote location and read at a master control board by use of a single Wheatstone bridge and galvanometer. The device is of sturdy construction and involves no expendable diaphragm or seal members.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for determining remotely the pressure in a fluid system comprising two identical thin spherical dish-shaped parallel concave elastic diaphragms each having a concave and a convex side; a core member for admitting fluid to the space between said diaphragms, to apply the pressure of said fluid to the concave side of one of said diaphragms and to the convex side of the other of said diaphragms, and for providing support for said diaphragms when said fluid pressure is appreciably less than the pressure upon the convex side of said first-named diaphragm and the concave side of said second-named diaphragm; said core member having surfaces adjacent the free surfaces of said diaphragms; a casing open to the atmosphere surrounding the convex side of said first-named diaphragm and the concave side of said second-named diaphragm; strain gages attached to the unpressurized sides of said diaphragms so as to measure tensile stress in the extreme fibers of said first-named diaphragm and compressive stress in the extreme fibers of said second-named diaphragm due to bending thereof produced by fluid pressure on the pressurized side thereof; and electrical means positioned remotely from said diaphragms for measuring variations in resistance of said strain gages whereby the pressure of said fluid is measured.

2. A pressure gage comprising a chamber open to atmospheric pressure, a cylindrical core member within said chamber having a pressure inlet port and conduits communicating from said inlet port to the ends of said cylindrical core member, a thin concave elastic diaphragm sealingly attached to one end of said core member with its concave side facing said core member, a second thin concave elastic diaphragm sealingly attached to the other end of said core member with its convex side facing said core member, electrical resistance strain gage means attached to the outside faces of said diaphragms to be responsive to bending stresses in said diaphragms, and electrical means for measuring the resistance in said strain gages to thereby measure pressure in said core member.

3. A pressure gage comprising a chamber open to atmospheric pressure, a right circular cylindrical core member within said chamber having a pressure inlet port and conduits communicating from said inlet port to the ends of said cylindrical core member, said core member having one plane end and one concave end; a thin elastic deflectable convex diaphragm covering the plane end of said core member; a second thin elastic diaphragm of concave shape covering the concave end of said core member; electrical resistance strain gages attached to the outsides of said diaphragms to be responsive to bending stresses in said diaphragms; and means for measuring variations in resistance of said strain gages in response to pressure variations within said core member to thereby measure said pressure variations.

CHARLES C. WAUGH.

References Cited in the file of this patent

UNITED STATES PATENTS

| Number | Name | Date |
| --- | --- | --- |
| 2,203,460 | Fieber | Jan. 4, 1940 |
| 2,398,372 | Green | Apr. 16, 1946 |
| 2,400,467 | Ruge | May 14, 1946 |
| 2,420,148 | Ostergren | May 6, 1947 |
| 2,470,714 | Nevius | May 17, 1949 |